United States Patent
Cheng et al.

(10) Patent No.: US 10,075,328 B2
(45) Date of Patent: Sep. 11, 2018

(54) POINT-TO-MULTIPOINT RING NETWORK PROTECTION METHOD AND DEVICE

(71) Applicant: CHINA MOBILE COMMUNICATIONS CORORATION, Beijing (CN)

(72) Inventors: Weiqiang Cheng, Beijing (CN); Lei Wang, Beijing (CN); Han Li, Beijing (CN); Wen Ye, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 290 days.

(21) Appl. No.: 14/766,013

(22) PCT Filed: Jan. 27, 2014

(86) PCT No.: PCT/CN2014/071551
§ 371 (c)(1),
(2) Date: Aug. 5, 2015

(87) PCT Pub. No.: WO2014/121709
PCT Pub. Date: Aug. 14, 2014

(65) Prior Publication Data
US 2015/0372856 A1    Dec. 24, 2015

(30) Foreign Application Priority Data

Feb. 5, 2013 (CN) .......................... 2013 1 0045807

(51) Int. Cl.
| *H04L 12/24* | (2006.01) |
| *H04L 12/437* | (2006.01) |
| *H04L 12/723* | (2013.01) |
| *H04L 12/707* | (2013.01) |

(52) U.S. Cl.
CPC ........ *H04L 41/0654* (2013.01); *H04L 12/437* (2013.01); *H04L 41/06* (2013.01); *H04L 45/22* (2013.01); *H04L 45/50* (2013.01)

(58) Field of Classification Search
CPC ......... H04L 12/24; H04L 12/26; H04L 12/56; H04L 12/437; H04L 12/4625; H04L 41/0654; H04L 45/28
See application file for complete search history.

(56) References Cited

U.S. PATENT DOCUMENTS

| 2009/0219806 A1 | 9/2009 | Chen et al. | |
| 2011/0164493 A1* | 7/2011 | Bragg ................. | H04L 12/4625 370/217 |

(Continued)

FOREIGN PATENT DOCUMENTS

| CN | 101552715 A | 10/2009 |
| CN | 101729229 A | 6/2010 |

(Continued)

OTHER PUBLICATIONS

Written Opinion (WO) dated May 16, 2014 for International Application No. PCT/CN2014/071551.

(Continued)

*Primary Examiner* — Raj Jain
*Assistant Examiner* — Leon Andrews
(74) *Attorney, Agent, or Firm* — Ladas & Parry LLP (57) ABSTRACT

A p2mp ring network protection method including, for each ring in the p2mp ring network, determining p2mp services with an identical off-ring node as a protection group; and establishing a pair of closed loop channels in opposite directions for each protection group; for each p2mp service, taking one of the closed loop channels as a working channel, and taking the other one of the closed loop channels as a protection channel. According to the present disclosure, the network structure can be simplified and the network resources can be saved.

5 Claims, 4 Drawing Sheets

(56) References Cited

U.S. PATENT DOCUMENTS

2012/0281705 A1 11/2012 Ye
2013/0194913 A1* 8/2013 Sun .................. H04L 45/28
370/223

FOREIGN PATENT DOCUMENTS

| CN | 102201985 A | 9/2011 |
| CN | 102387027 A | 3/2012 |
| CN | 102882757 A | 1/2013 |
| CN | 102882780 A | 1/2013 |

OTHER PUBLICATIONS

Supplementary European Search Report dated Jul. 13, 2016 for Application No. EP 14 74 8908.
Zhang, J., et al., "Two Novel Tunnel-based Ring Protection Switching for MPLS-TP Multicast Services", '2011 18$^{th}$ International Conference on Telecommunications, May 8, 2011, pp. 458-462.
Weingarten, Y., et al., "Applicability of MPLS-TP Linear Protection for Ring Topologies", draft-weingarten-mpls-tp-ring-protection-06. txt, Internet Engineering Task Force (IETF), Internet Society (ISOC), No. 6, pp. 1-28, Sep. 5, 2011.
Chinese Office Action dated Nov. 4, 2016 for Chinese Application o. 201310045807.2.
International Search Report dated May 16, 2014 for Application No. PCT/CN2014/071551.
Chinese Office Action dated May 4, 2017 for Chinese Application o. 201310045807.2 with English translation.
Espacenet English abstract of CN 102201985 A downloaded Sep. 18, 2017.
Espacenet English abstract of CN 101729229 A downloaded May 27, 2015.
Espacenet English abstract of CN 101552715 A downloaded May 27, 2015.
Espacenet English abstract of CN 102387027 A downloaded May 27, 2015.
Espacenet English abstract of CN 102882780 A downloaded Sep. 18, 2017.
Espacenet English abstract of CN 102882757 A downloaded Sep. 18, 2017.

* cited by examiner

FIG. 1

PRIOR ART

FIG. 2

PRIOR ART

POINT-TO-MULTIPOINT RING NETWORK PROTECTION METHOD AND DEVICE

CROSS-REFERENCE TO RELATED APPLICATION

The present application is the U.S. national phase of PCT Application No. PCT/CN2014/071551 filed on Jan. 27, 2014, which claims a priority of the Chinese patent application No. 201310045807.2 filed on Feb. 5, 2013 and entitled "point-to-multipoint ring network protection method and device", which are incorporated herein by reference in its entirety.

TECHNICAL FIELD

The present disclosure relates to the field of network technology, in particular to a point-to-multipoint ring network protection method and device.

BACKGROUND

In an existing point-to-multipoint (p2mp) ring network protection method, usually a closed-loop channel in a direction opposite to each working channel is established as a protection channel for each working channel. The allocation of labels for the protection channel must be associated with the allocation of labels for the working channel, so as to ensure LSP (label switching path)-based protection switching for a p2mp service between the working channel and the protection channel.

Figure 1:
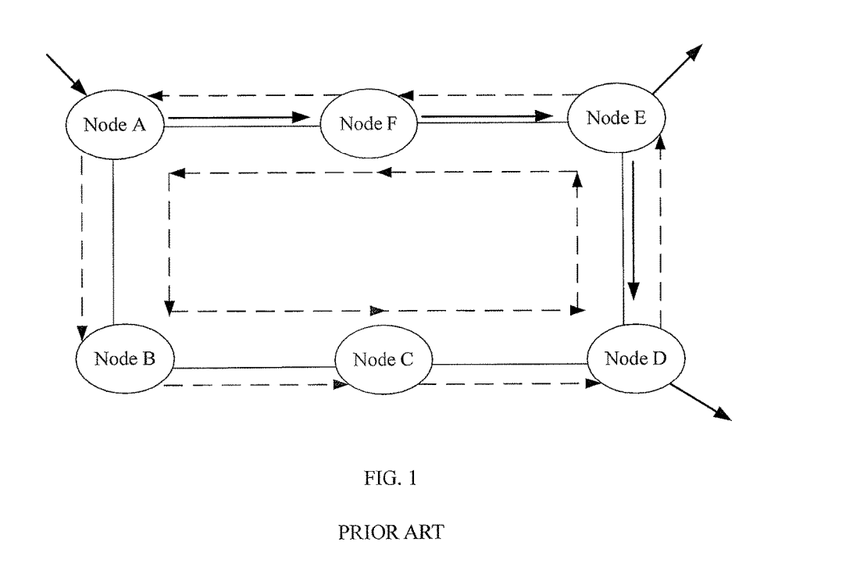
FIG. 1 is a schematic view showing an existing p2mp ring network protection method.

FIG. 1 is a schematic view showing an existing p2mp ring network protection method. As shown in FIG. 1, a solid line without any arrow represents a physical link, a solid line with an arrow represents LSP for a p2mp service, and a dotted line with an arrow represents an established protection channel. As can be seen from FIG. 1, the p2mp service enters the ring at a node A, while it leaves the ring at nodes D and E. Accordingly, it is required to establish two protection channels for the p2mp service.

Figure 2:
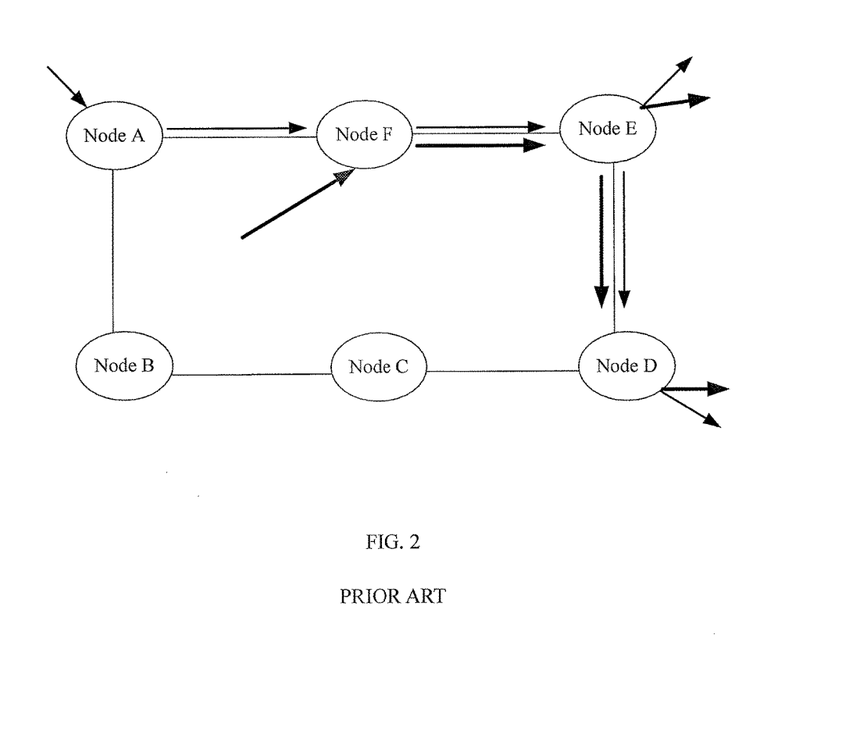
FIG. 2 is a schematic view showing a situation where there are two p2mp services in one ring.

FIG. 2 is a schematic view showing a situation where there are two p2mp services in one ring. As shown in FIG. 2, in addition to the p2mp service shown in FIG. 1, another p2mp service enters the ring at a node F, while it leaves the ring at nodes D and E. Although this p2mp service and the p2mp service shown in FIG. 1 have same off-ring nodes, they have different on-ring nodes and thus another two protection channels are required to be established for this p2mp service.

It can therefore be seen that, in the related art, the protection channels are established by taking each p2mp service which enters the ring as a unit. In other words, the number of the protection channels established for each ring depends linearly on the number of the p2mp services. As a result, there are too many protection channels, and the resultant network structure is very complex.

SUMMARY

In view of this, the present disclosure provides a p2mp ring network protection method and device, which can simplify the network structure and save the network resources.

In order to achieve the above object, technical solutions of the present disclosure are as follows.

A p2mp ring network protection method, includes performing following processing in each ring in the p2mp loop network:

determining p2mp services with an identical off-ring node as a protection group; and establishing a pair of closed loop channels in opposite directions for each protection group; for each p2mp service, taking one of the closed loop channels as a working channel, and taking the other one of the closed loop channels as a protection channel.

A p2mp ring network protection device includes:

a protection module configured to, with respect to each ring in the p2mp ring network, determine p2mp services with an identical off-ring node as a protection group; establish a pair of closed loop channels in opposite directions for each protection group; for each p2mp service, take one of the closed loop channels as a working channel, and take the other one of the closed loop channels as a protection channel.

A node located at one ring of a ring network. Each protection group in the ring corresponds to a pair of closed loop channels in opposite directions. For each p2mp service, one of the closed loop channels is taken as a working channel, and the other one of the closed loop channels is taken as a protection channel. The p2mp services with an identical off-ring node form one protection group.

The node includes a first processing module and a second processing module. The first processing module is configured to, when receiving a data stream of any p2mp service, determine a type of the node corresponding to the p2mp service, and transmit the received data stream and the determined type of the node to the second processing module, the type of the node including an on-ring node, an intermediate node, and an off-ring node.

The second processing module is configured to perform different processing on the received data stream according to the type of the node.

According to the embodiments of the present disclosure, the protection channel is not established by taking one p2mp service as a unit. Instead, the p2mp services with an identical off-ring node are taken as one protection group, and a pair of closed loop channels in opposite directions is established for each protection group. As a result, the network structure can be simplified, and the network resources as well as the implementation cost can be reduced.

DETAILED DESCRIPTION

In order to overcome the existing drawbacks in the related art, the present disclosure provides a p2mp ring network protection method, which can simplify network structure and save network resources.

In order to make the technical solutions of the present disclosure more apparent, the technical solutions of the present disclosure will be described hereinafter in conjunction with the drawings and the embodiments.

Figure 3:
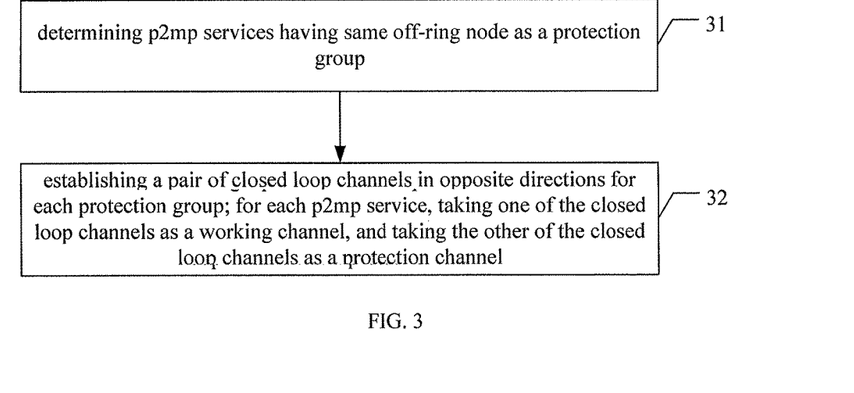
FIG. 3 is a flow chart of a p2mp ring network protection method according to one embodiment of the present disclosure.

FIG. 3 is a flow chart of a p2mp ring network protection method according to one embodiment of the present disclosure. Each ring in the ring network may be processed in a way shown in FIG. 3. As shown in FIG. 3, the method includes following steps.

Step 31: determining p2mp services having same off-ring node as a protection group.

In the technical solution of the present disclosure, the p2mp services having the same off-ring node may be determined as a protection group. As shown in FIG. 2, one p2mp service enters a ring from a node A and leaves the ring at nodes D and E; another p2mp service enters the ring at a node F and leaves the ring at the nodes D and E; then, the two p2mp services belong to the same protection group.

Step 32: establishing a pair of closed loop channels in opposite directions for each protection group; for each p2mp service, taking one of the closed loop channels as a working channel, and taking the other of the closed loop channels as a protection channel.

A pair of closed loop channels in opposite directions, i.e., a closed loop channel in a clockwise direction and a closed loop channel in a counterclockwise direction, may be established for each protection group, and the two channels are protection channels relative to each other. For each p2mp service, one of the closed loop channels is taken as the working channel, while the other of the closed loop channels is taken as the protection channel.

Theoretically, for a ring including n nodes, when there are two off-ring nodes, there are $C_n^2$ combinations for these off-ring nodes, e.g., a combination of nodes A and B when they are off-ring nodes, or a combination of nodes A and C when they are off-ring nodes. Correspondingly, when there are three off-ring nodes, there are $C_n^3$ combinations for these off-ring nodes, and when there are m (m<n) off-ring nodes, there are $C_n^m$ combinations for these off-ring nodes. Since each combination for the off-ring nodes corresponds to one protection group, thus theoretically there are at most $C_n^2 + C_n^3 + \ldots + C_n^{n-1} = 2^n - n - 2$ protection groups in the ring. However, in the actual application, the possible combinations for the off-ring nodes are very limited in one ring, i.e., the number of the protection groups is very limited. Correspondingly, the number of the closed loop channels desired to be established is very limited too.

The time when the closed loop channel is established may be determined according to the practical need. For example, after one p2mp service enters the ring from a certain node, a pair of closed loop channels in opposite directions are established for this p2mp service. Then, when another p2mp service enters the ring from another node and it is found that this p2mp service and the previous p2mp service have same off-ring node, the pair of previously established closed loop channels in opposite directions may be multiplexed by this p2mp service. When it is found that this p2mp service and the previous p2mp service have different off-ring nodes, a new pair of closed loop channels in opposite directions are required to be established for this p2mp service.

Figure 4:
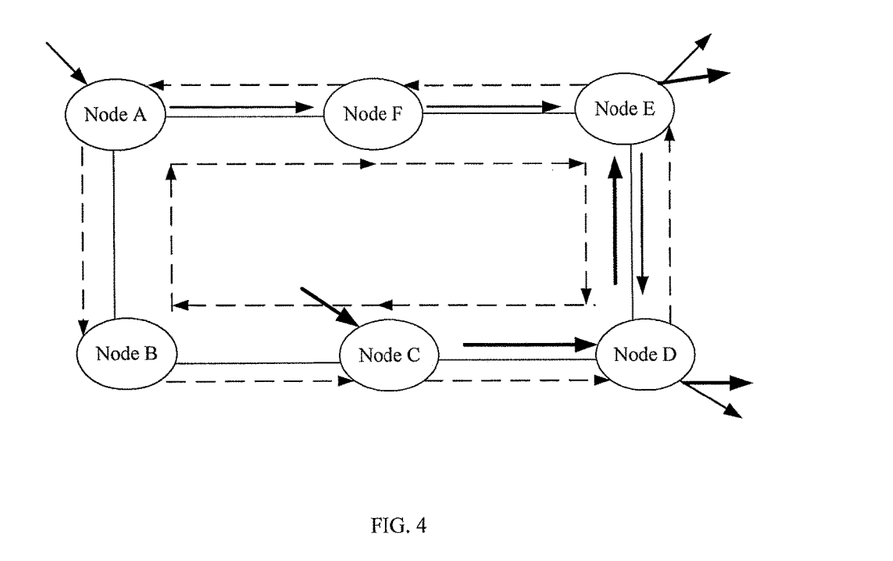
FIG. 4 is a schematic view showing a pair of closed loop channels in opposite directions shared by two p2mp services according to one embodiment of the present disclosure.

FIG. 4 is a schematic view showing a pair of closed loop channels in opposite directions shared by two p2mp services according to one embodiment of the present disclosure. As shown in FIG. 4, a solid line without any arrow represents a physical link, a solid line with an arrow represents an LSP for a p2mp service, and a dotted line with an arrow represents an established closed loop channel. One p2mp service enters the ring from a node A and leaves the ring from nodes D and E. For this p2mp service, the closed loop channel in a clockwise direction is taken as its working channel, and the closed loop channel in a counterclockwise direction is taken as its protection channel. Another p2mp service enters the ring from a node C and leaves the ring from the nodes D and E. For this p2mp service, the closed loop channel in the counterclockwise direction is taken as its working channel, and the closed loop channel in the clockwise direction is taken as its protection channel.

It should be appreciated that, Steps 31 and 32 in FIG. 3 are provided merely for ease of the description, but shall not be used to limit an order thereof.

In the technical solution of the present disclosure, the p2mp service may be processed by allocating a label for a downstream node by an upstream node, and the allocated label may be used for identifying a next hop node of a data stream.

For each node in the ring, when receiving data stream of any p2mp service, a type of the node itself corresponding to this p2mp service may first be determined, and the type includes an on-ring node, an intermediate node, and an off-ring node. Then, different processing manners such as following processing manners 1) to 3) may be performed on the received data stream according to different types of the node.

1) When determining that the type of the current node itself is an on-ring node, a working channel label is allocated for a node adjacent to the current node in a direction of the working channel after the LSP layer label switching has been performed on the received data stream. The allocated working channel label is packaged into the received data stream, and then transmitted to the node adjacent to the current node in the direction of the working channel.

The completion of the LSP layer label switching may refer to the related art.

2) When determining that the type of the current node itself is an intermediate node, a working channel label is allocated for a node adjacent to the current node in the direction of the working channel. An original working channel label in the received data stream is replaced with the allocated working channel label, and the resultant data stream is then transmitted to the node adjacent to the current node in the direction of the working channel.

3) When determining that the type of the current node itself is an off-ring node, further determining whether or not a node adjacent to the current node in the direction of the working channel is also an off-ring node. If not, the working channel label in the received data stream is removed, and an operation of leaving the ring is performed. If yes, the working channel label in the received data stream is removed, an operation of leaving the ring is performed, the working channel label is allocated for the node adjacent to the current node in the direction of the working channel, the original working channel label in the received data stream is replaced with the allocated working channel label, and then the resultant data stream is transmitted to the node adjacent to the current node in the direction of the working channel.

Figure 5:
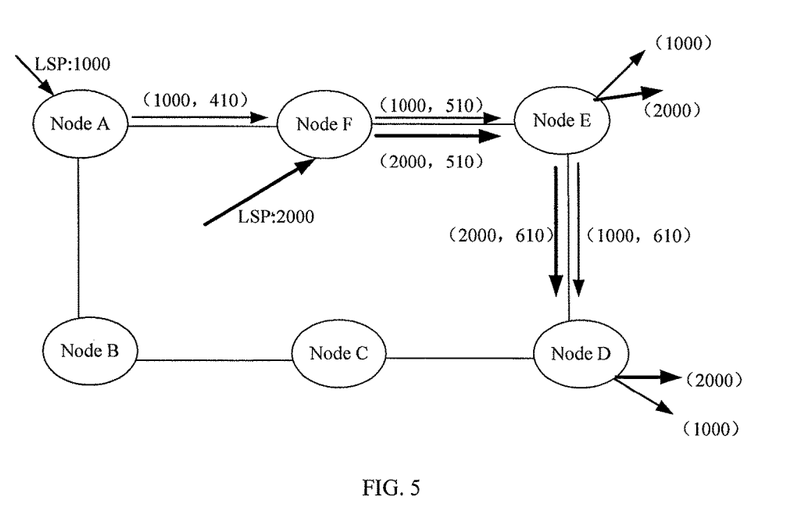
FIG. 5 is a schematic view showing a p2mp service processing mode according to one embodiment of the present disclosure.

FIG. 5 is a schematic view showing a p2mp service processing mode according to one embodiment of the present disclosure. As shown in FIG. 5, a solid line without any arrow represents a physical link, and a solid line with an arrow represents an LSP for the p2mp service.

For the p2mp service which enters a ring from a node A and leaves the ring at nodes E and D, the LSP layer label switching is performed at first on data stream of the p2mp service at the node A; after the switching, a label 1000 is obtained is allocated by the node D. Then, a working channel label 410 is allocated for a node F, packaged into the data stream, and transmitted to node F. A working channel label 510 is allocated by the node F for the node E, the original working channel label 410 in the received data stream is replaced with the working channel label 510, and the resultant data stream is then transmitted to the node E. The working channel label 510 in the received data stream is removed at the node E, and the node E performs an operation of leaving the ring. The node E allocates a working channel label 610 for the node D, replaces the working channel label 510 in the received data stream with the working channel label 610, and transmits the resultant data stream to the node D. The working channel label 610 in the received data stream is removed at the node D, and the node D performs an operation of leaving the ring. The execution of the operation of leaving the ring and the processing subsequent to this operation may refer to the related art.

For the p2mp service which enters the ring at the node F and leaves the ring at the nodes E and D, the LSP layer label switching is performed at first on the data stream of the p2mp service at the node F; after the switching, a label 2000 is obtained and allocated by the node D. Then, the working channel label 510 is allocated for the node E, packaged into the data stream, and transmitted to the node E. The working channel label 510 in the received data stream is removed at the node E, and an operation of leaving the ring is performed at the node E. The node E allocates the working channel label 610 for the node D, and replaces the working channel label 510 in the received data stream with the working channel label 610, and then transmits the resultant data stream to the node D. The working channel label 610 in the received data stream is removed at the node D, and an operation of leaving the loop is performed.

It can therefore be seen that, in the process as shown in FIG. 5, the label nesting is performed when the data stream is transmitted in the ring. Each node has no need to process the inner labels, i.e., LSP labels 1000 and 2000, and merely needs to process outer labels, i.e., channel labels.

In addition, each upstream node independently allocates a working channel label for a downstream node, and the working channel label is usually at a length of 20 bits. In order to prevent collision with labels allocated for downstream nodes in an existing point-to-point (p2p) mode, the label allocated by each upstream node in the embodiments of the present disclosure may be derived from a single label space, which is called as an environment label.

Moreover, for any p2mp service, when the data stream of the p2mp service cannot be transmitted to a part of, or all of, the off-ring nodes in the direction of the working channel due to a link fault, the data stream may be transmitted in a direction of the protection channel to the off-ring node to which the data stream of the p2mp service cannot be transmitted in the direction of the working channel.

To be specific, when any node which has received the data stream of the p2mp service determines that there is a fault in a link between the node and a node adjacent thereto in the direction of the working channel, the following processing may be performed.

1) When determining that a current node is an on-ring node, a protection channel label is allocated for a node adjacent to the current node in the direction of the protection channel after the LSP layer label switching has been performed on the received data stream. The allocated protection channel label is packaged into the received data stream, and then transmitted to the node adjacent thereto in the direction of the protection channel.

2) When determining that the current node is an intermediate node or an off-ring node, a protection channel label is allocated for a node adjacent to the current node in the direction of the protection channel, an original working channel label in the received data stream is replaced with the allocated protection channel label, and the resultant data stream is then transmitted to the node adjacent thereto in the direction of the protection channel.

The following processing which are performed at each node which receives the data stream carrying the protection channel label.

1) When determining that a current node is an intermediate node, a protection channel label is allocated for a node adjacent to the current node in the direction of the protection channel, an original protection channel label in the received data stream is replaced with the allocated protection channel label, and the resultant data stream is then transmitted to the node adjacent thereto in the direction of the protection channel.

2) When determining that the current node is an off-ring node and a node adjacent to the current node in the direction of the protection channel is also an off-ring node as well as there is a normal link between the current node and the adjacent node in the direction of the protection channel, the protection channel label in the received data stream is removed, and an operation of leaving the ring is performed. In addition, a protection channel label is allocated for the node adjacent thereto in the direction of the protection channel, the original protection channel label in the received data stream is replaced with the allocated protection channel label, and the resultant data stream is then transmitted to the node adjacent thereto in the direction of the protection channel.

3) When determining that the current node is an off-ring node and a node adjacent to the current node in the direction of the protection channel is also an off-ring node as well as there is a link fault between the current node and the adjacent node in the direction of the protection channel, the protection channel label in the received data stream is removed, and an operation of leaving the ring is performed.

4) When determining that the current node is an off-ring node and a node adjacent to the current node in the direction of the protection channel is not an off-ring node, the protection channel label in the received data stream is removed, and an operation of leaving the ring is performed.

Figure 6:
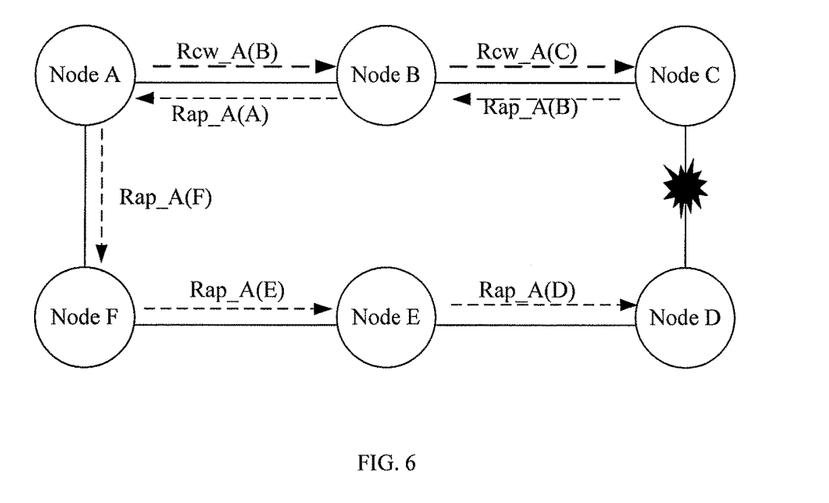
FIG. 6 is a schematic view showing a fault processing mode according to one embodiment of the present disclosure.

FIG. 6 is a schematic view showing a fault processing mode according to one embodiment of the present disclosure. As shown in FIG. 6, one p2mp service enters the ring at a node A and leaves the ring at nodes C and D. Presumed that there is a link fault between the nodes C and D, a data stream transmitted to node C will not be affected. With respect to the data stream of the p2mp service, a working channel label is packaged at the node A, replaced at a node B, and removed at the node C, and then an operation of leaving the ring is performed. In other words, a working path from the node A to the node C is: the node A-the node B-the node C, and a label processing flow includes packaging the working channel label Rcw_A(B) at the node A-replacing Rcw_A(B) with Rcw_A(C) at the node B-removing Rcw_A (c) at the node C.

However, the data stream transmitted to the node D will be affected. Correspondingly, it is required to perform protection switching at the node C, so as to switch to the protection channel in an opposite direction. At the node C, the working channel label in the received data stream is replaced with the protection channel label allocated for the node B, and the resultant data stream is then transmitted to the node B. At the nodes B, A, F and E, the original protection channel label in the received data stream is sequentially replaced with the protection channel label allocated for the adjacent node in the direction of the protection channel. At the node D, the protection channel label in the received data stream is removed, and an operation of leaving the ring is performed. In other words, a working path from the node A to the node D is: the node A-the node B-the node C-the node B-the node A-the node F-the node E-the node D, and a label processing flow includes: packing the working channel label Rcw_A(B) at the node A-replacing Rcw_A(B) with Rcw_A(C) at the node B-replacing Rcw_A(C) with Rap_A(B) at the node C-replacing Rap_A(B) with Rap_A (A) at the node B-replacing Rap_A(A) with Rap_A(F) at the node A-replacing R_A(F) with Rap_A(E) at the node F-replacing Rap_A(E) with Rap_A(D) at the node E-removing Rap_A(D) at the node D.

Figure 7:
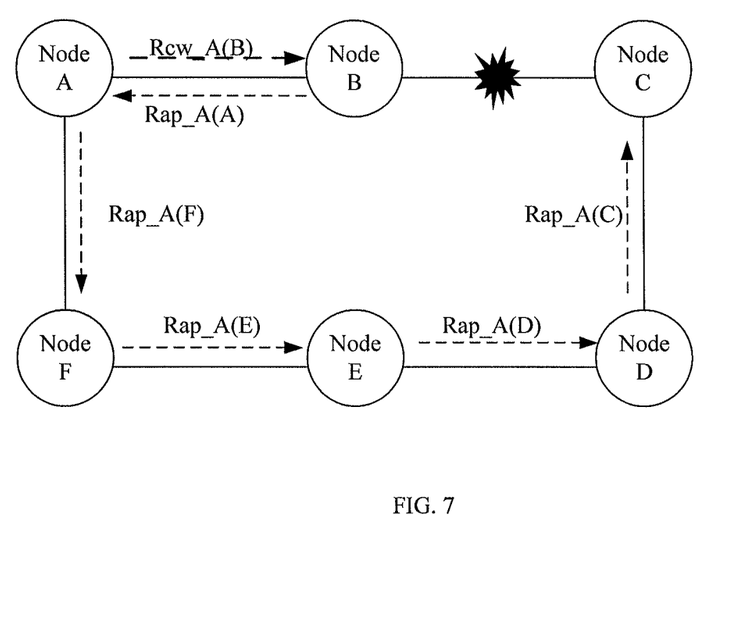
FIG. 7 is a schematic view showing a fault processing mode according to another embodiment of the present disclosure.

As shown in FIG. 7, which is schematic view showing a fault processing mode according to another embodiment of the present disclosure, one p2mp service enters the ring at a node A and leaves the ring at nodes C and D. Presumed that there is a link fault between nodes B and C, the data stream transmitted to the node C will be affected. With respect to the data stream of the p2mp service, a working channel label is packaged at the node A, and the protection switching is performed at the node B so as to switch to the protection channel in an opposite direction. At the nodes B, A, F, E and D, the protection channel labels are sequentially replaced. At the node C, the protection channel label is removed, and an operation of leaving the ring is performed. In other words, a working path from the node A to the node C is: the node A-the node B-the node A-the node F-the node E-the node D-the node C, and a label processing flow includes: packing the working channel label Rcw_A(B) at the node A-replacing Rcw_A(B) with the protection channel label Rap_A(A) at the node B-replacing Rap_A(A) with Rap_A(F) at the node A-replacing Rap_A(F) with Rap_A(E) at the node F-replacing Rap_A(E) with Rap_A(D) at the node E-replacing Rap_A(D) with Rap_A(C) at the node D-removing Rap_A(C) at the node C.

The data stream transmitted to the node D will also be affected. With respect to the data stream of the p2mp service, a working channel label is packaged at the node A, and the protection switching is performed at the node B so as to switch to the protection channel in an opposite direction. At the nodes B, A, F and E, the protection channel labels are replaced sequentially. At the node D, the protection channel label is removed, and an operation of leaving the ring is performed. In other words, a working path from the node A to the node D is: the node A-the node B-the node A-the node F-the node E-the node D, and a label processing flow includes: packaging the working channel label Rcw_A(B) at the node A-replacing Rcw_A(B) with the protection channel label Rap_A(A) at the node B-replacing Rap_A(A) with Rap_A(F) at the node A-replacing Rap_A(F) with Rap_A(E) at the node F-replacing Rap_A(E) with Rap_A(D) at the node E-removing Rap_A(D) at the node D.

A situation where there is a fault at one node is equivalent to a situation where there is a fault at two links connected with the node. The processing mode therefor is the same as those mentioned above when there is a link fault, and thus will not be repeated herein.

To this, the introduction of the method of the embodiments of the present disclosure is finished.

Based on the above, the present disclosure further provides in one embodiment a p2mp ring network protection device and a node, which will be described hereinafter.

The p2mp ring network protection device may include a protection module configured to, perform following processing with respect to each ring in the p2mp ring network. The processing includes: determine p2mp services with an identical off-ring node as a protection group; establishing a pair of closed loop channels in opposite directions for each protection group; for each p2mp service, taking one of the closed loop channels as a working channel, and taking the other one of the closed loop channels as a protection channel.

The node is located at one ring of the ring network. Each protection group in the ring corresponds to a pair of closed loop channels in opposite directions. For each p2mp service, one of the closed loop channels is taken as its working channel, and the other one of the closed loop channels is taken as its protection channel. The p2mp services with an identical off-ring node form one protection group.

The node may include a first processing module and a second processing module. The first processing module is configured to, when receiving a data stream of any p2mp service, determine a type of the node corresponding to the p2mp service, and transmit the received data stream and the determined type of the node to the second processing module. The type of the node includes an on-ring node, an intermediate node, and an off-ring node. The second processing module is configured to perform different processing on the received data stream according to different types of the node.

To be specific, when determining that a current node is an on-ring node, the second processing module is configured to allocate a working channel label for a node adjacent to the current node in a direction of the working channel after the LSP layer label switching has been performed on the received data stream, package the allocated working channel label into the received data stream, and then transmit the resultant data stream to the node adjacent to the current node in the direction of the working channel.

When determining that the current node is an intermediate node, the second processing module is configured to allocate a working channel label for a node adjacent to the current node in the direction of the working channel, replace an original working channel label in the received data stream with the allocated working channel label, and then transmit the resultant data stream to the node adjacent to the current node in the direction of the working channel.

When determining that the node is an off-ring node, the second processing module is configured to further determine whether or not a node adjacent to the current node in the direction of the working channel is also an off-ring node; if not, remove the working channel label in the received data stream, and perform an operation of leaving the ring; and if yes, remove the working channel label in the received data stream, perform an operation of leaving the ring, allocate the working channel label for the node adjacent to the current node in the direction of the working channel, replace the original working channel label in the received data stream with the allocated working channel label, and then transmit the resultant data stream to the node adjacent to the current node in the direction of the working channel.

In addition, when determining that the data stream of the p2mp service cannot be received at a part of, or all of, the off-ring nodes due to a link fault between the current node and the adjacent node in the direction of the working channel, the second processing module may further be configured to:

when determining that the current node is an on-ring node, allocate a protection channel label for the node adjacent to the current node in the direction of the protection channel after the LSP layer label switching has been performed on the received data stream, package the allocated protection channel label into the received data stream, and then transmit the resultant data stream to the node adjacent thereto in the direction of the protection channel; and when determining that the current node is an intermediate node or an off-ring node, allocate a protection channel label for the node adjacent to the current node in the direction of the protection channel, replace an original working channel label in the received data stream with the allocated protection channel label, and then transmit the resultant data stream to the node adjacent thereto in the direction of the protection channel.

When receiving the data stream carrying the protection channel label, the second processing module may further be configured to:

when determining that the current node is an intermediate node, allocate the protection channel label for a node adjacent to the current node in the direction of the protection channel, replace an original protection channel label in the received data stream with the allocated protection channel label, and then transmit the resultant data stream to the node adjacent thereto in the direction of the protection channel;

when determining that the current node is an off-ring node, a node adjacent to the current node in the direction of the protection channel is also an off-ring node and there is a normal link between the current node and the adjacent node in the direction of the protection channel, remove the protection channel label in the received data stream, perform an operation of leaving the ring, allocate a protection channel label for the node adjacent thereto in the direction of the protection channel, replace the original protection channel label in the received data stream with the allocated protection channel label, and then transmit the resultant data stream to the node adjacent thereto in the direction of the protection channel;

when determining that the current node is an off-ring node, a node adjacent to the current node in the direction of the protection channel is also an off-ring node and there is a link fault between the current node and the adjacent node in the direction of the protection channel, remove the protection channel label in the received data stream, and perform an operation of leaving the ring; and when determining that the current node is an off-ring node and a node adjacent to the current node in the direction of the protection channel is not an off-ring node, remove the protection channel label in the received data stream, and perform an operation of leaving the ring.

The specific working process of the above-mentioned device may refer to the above method, and thus will not be repeated herein.

The embodiments of the device and the method thereof have been described hereinbefore using block diagrams, flow charts and/or examples. It should be appreciated that, in the case that the block diagrams, flow charts and/or examples include one or more functions and/or operations, each function and/or operation included in the block diagrams, flow charts and/or examples may be implemented individually, or collectively, through hardware, software, firmware or essentially the combinations thereof. In one embodiment, several parts of the subject matter of the present disclosure may be implemented by an application specific integrated circuit (ASIC), a field programmable gate array (FPGA), a digital signal processor (DSP) or any other integration formats.

Any module in the embodiments of the present disclosure may be implemented mechanically or electronically. For example, one module may include a permanent circuit or a logic element for a specific operation. The module may also include a programmable logic element or circuit (e.g., a general-purpose processor or any other programmable processors) configured temporarily by the software, so as to perform the specific operation. However, it should also be appreciated that, some aspects of the embodiments of the present disclosure may be, completely or partially, implemented equivalently in an integrated circuit as one or more programs capable of being run on one or more computers (e.g., computer systems), one or more programs capable of being run on one or more processors (e.g., microprocessors), firmware, or essentially combinations thereof. According to the present disclosure, a person skilled in the art has the capability of designing the circuits and/or writing software and/or firmware codes. In addition, it should further be appreciated that, mechanisms of the subject matter of the present disclosure may be dispersed as program products in various forms, and regardless of the types of a signal-carrying medium actually used for the dispersion, the signal-carrying medium may be applicable to the illustrative embodiments of the subject matter of the present disclosure. Examples of the signal-carrying medium include, but not limited to, a recording-type medium such as a soft disc, a hard disc drive, a compact disc (CD), a digital versatile disc (DVD), a digital tape and a computer memory; and a transmission-type medium such as a digital and/or analogue communication medium (e.g., an optical fiber/cable, a waveguide tube, a wired communication link and a wireless communication link).

The present disclosure has been described with reference to the flow charts and/or block diagrams of the method, device and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely preferred embodiments of the present disclosure, but shall not be used to limit the present disclosure. A person skilled in eth art may make modifications, substitutions and improvements without departing from the spirit and principle of the present disclosure, and these modifications, substitutions and improvements shall also fall within the scope of the present disclosure.

What is claimed is:

1. A point-to-multipoint (p2mp) ring network protection method, comprising: performing following operations in each ring in the p2mp ring network:
    establishing a pair of closed loop channels in opposite directions for a plurality of p2mp services with a common off-ring node; for each of the plurality of p2mp services, taking one of the pair of closed loop channels as a working channel, and taking a remaining one of the pair of closed loop channels as a protection channel;
    wherein the method further comprises: for each node in the ring, when receiving a data stream of at least one of the plurality of the p2mp services, determining a type of each node corresponding to the at least one p2mp service, and a step of performing different processing on the received data stream according to the types of the nodes, the types of the nodes comprising an on-ring node, an intermediate node, and an off-ring node; and
    wherein the step of performing different processing on the received data stream according to the types of the nodes comprises:
        when determining that a type of one node is the on-ring node, assigning a working channel label for a node adjacent to the one node in a direction of the working channel after label switching path (LSP) layer label switching has been performed on the received data stream, encapsulating the assigned working channel label into the received data stream, and then transmitting a resultant data stream to the node adjacent to the one node in the direction of the working channel;
        when determining that the type of one node is the intermediate node, assigning the working channel label for a node adjacent to the one node in the direction of the working channel, replacing an original working channel label in the received data stream with the assigned working channel label, and then transmitting the resultant data stream to the node adjacent to the one node in the direction of the working channel; and
        when determining that the type of one node is the off-ring node, determining whether or not the type of the node adjacent to the one node in the direction of the working channel is also the off-ring node; if not, removing the working channel label in the received data stream and performing an operation of leaving the ring; if yes, removing the working channel label in the received data stream, performing the operation of leaving the ring, assigning the working channel label for the node adjacent to the one node in the direction of the working channel, replacing the original working channel label in the received data stream with the assigned working channel label, and then transmitting the resultant data stream to the node adjacent to the one node in the direction of the working channel.

2. The method according to claim 1, further comprising:
    when the data stream of the at least one p2mp service is unable to be transmitted to a part of, or all of, off-ring nodes in the direction of the working channel due to a link fault, transmitting the data stream in a direction of the protection channel to each off-ring node to which the data stream of the at least one p2mp service is unable to be transmitted in the direction of the working channel.

3. The method according to claim 2, wherein the step of transmitting the data stream in the direction of the protection channel to each off-ring node to which the data stream of the at least one p2mp service is unable to be transmitted in the direction of the working channel comprises:
    when any one node which has received the data stream of the at least one p2mp service determines that there is a fault in a link between the any one node and a node adjacent to the any one node in the direction of the working channel, performing following operations:
        when determining that the type of the one node is the on-ring node, assigning a protection channel label for a node adjacent to the one node in the direction of the protection channel after the LSP layer label switching has been performed on the received data stream, encapsulating the assigned protection channel label into the received data stream, and then transmitting the resultant data stream to the node adjacent to the one node in the direction of the protection channel;
        when determining that the type of one node is the intermediate node or the off-ring node, assigning the protection channel label for the node adjacent to the one node in the direction of the protection channel, replacing an original working channel label in the received data stream with the assigned protection channel label, and then transmitting the resultant data stream to the node adjacent to the one node in the direction of the protection channel, and
    wherein nodes which receive the data stream carrying the protection channel label respectively perform following operations:
        when determining that the type of one of the nodes which receive the data stream carrying the protection channel label is the intermediate node, assigning the protection channel label for the node adjacent to the one of the nodes in the direction of the protection channel, replacing an original protection channel label in the received data stream with the assigned protection channel label, and then transmitting the resultant data stream to the node adjacent to the one of the nodes in the direction of the protection channel;
        when determining that the type of one of the nodes which receive the data stream carrying the protection channel label is the off-ring node, the type of the node adjacent to the one of the nodes in the direction of the protection channel is also the off-ring node and there is a normal link between the one of the nodes and the adjacent node in the direction of the protection channel, removing the protection channel label in the received data stream, performing an operation of leaving the ring, assigning a protection channel label to the node adjacent to the one of the nodes in the direction of the protection channel, replacing the original protection channel label in the received data stream with the assigned protection channel label, and then transmitting the resultant data stream to the node adjacent to the one of the nodes in the direction of the protection channel;

when determining that the type of one of the nodes which receive the data stream carrying the protection channel label is the off-ring node, the type of the node adjacent to the one of the nodes in the direction of the protection channel is also the off-ring node and there is the link fault between the one of the nodes and the adjacent node in the direction of the protection channel, removing the protection channel label in the received data stream, and performing the operation of leaving the ring; and when determining that the type of one of the nodes which receive the data stream carrying the protection channel label is the off-ring node and the type of the node adjacent to the one of the nodes in the direction of the protection channel is not the off-ring node, removing the protection channel label in the received data stream, and performing the operation of leaving the ring.

4. A node located at one ring of a ring network, a plurality of p2mp services with a common off-ring node in the ring corresponding to: a pair of closed loop channels in opposite directions; for each p2mp service, one of the pair of closed loop channels being taken as a working channel, a remaining one of the pair of closed loop channels being taken as a protection channel;

wherein the node comprises a first processing module and a second processing module;

wherein the first processing module is configured to, when receiving a data stream of at least one of the plurality of the p2mp services, determine a type of the node corresponding to the at least one p2mp service, and transmit the received data stream and the determined the types of the node to the second processing module, the types of the nodes comprising an on-ring node, an intermediate node, and an off-ring node; and the second processing module is configured to perform different processing on the received data stream according to the types of the nodes;

wherein when the type of the node is the on-ring node, the second processing module is configured to assign a working channel label for an adjacent node of the node in a direction of the working channel after label switching path (LSP) layer label switching has been performed on the received data stream, encapsulate the assigned working channel label into the received data stream, and then transmit a resultant data stream to the adjacent node of the node in the direction of the working channel;

when the type of the node is the intermediate node, the second processing module is configured to assign the working channel label for the adjacent node of the node in the direction of the working channel, replace an original working channel label in the received data stream with the assigned working channel label, and then transmit the resultant data stream to the adjacent node of the current node in the direction of the working channel;

when the type of the node is the off-ring node, the second processing module is further configured to determine whether or not the adjacent node of the node in the direction of the working channel is also the off-ring node; if not, remove the working channel label in the received data stream, and perform an operation of leaving the ring; and if yes, remove the working channel label in the received data stream, perform the operation of leaving the ring, assign the working channel label to the adjacent node of the node in the direction of the working channel, replace the original working channel label in the received data stream with the assigned working channel label, and then transmit the resultant data stream to the adjacent node of the node in the direction of the working channel.

5. The node according to claim 4, wherein when determining that the data stream of the at least one p2mp service is unable to be received at a part of, or all of, off-ring nodes due to a link fault between the node and the adjacent node of the node in the direction of the working channel, the second processing module is further configured to:

when determining that the type of the node is the on-ring node, assign a protection channel label to the adjacent node of the current node in the direction of the working channel after the LSP layer label switching has been performed on the received data stream, encapsulate the assigned protection channel label into the received data stream, and then transmit the resultant data stream to the adjacent node of the node in a direction of the protection channel; and when determining that the type of the node is the intermediate node or the off-ring node, assign the protection channel label to the adjacent node of the node in the direction of the protection channel, replace an original working channel label in the received data stream with the assigned protection channel label, and then transmit the resultant data stream to the adjacent node of the node in the direction of the protection channel;

wherein when receiving the data stream carrying the protection channel label, the second processing module is further configured to:

when determining that the type of the node is the intermediate node, assign the protection channel label to the adjacent node of the node in the direction of the protection channel, replace an original protection channel label in the received data stream with the assigned protection channel label, and then transmit the resultant data stream to the adjacent node of the node in the direction of the protection channel;

when determining that the type of the node is the off-ring node, and the type of the adjacent node of the node in the direction of the protection channel is also the off-ring node and there is a normal link between the node and the adjacent node of the node in the direction of the protection channel, remove the protection channel label in the received data stream, perform the operation of leaving the ring, assign the protection channel label to the adjacent node of the node in the direction of the protection channel, replace the original protection channel label in the received data stream with the assigned protection channel label, and then transmit the resultant data stream to the adjacent node of the node in the direction of the protection channel;

when determining that the type of the node is the off-ring node, the type of the adjacent node of the node in the direction of the protection channel is also the off-ring node and there is the link fault between the node and the adjacent node of the node in the direction of the protection channel, remove the protection channel label in the received data stream, and perform the operation of leaving the ring; and when determining that the type of the node is the off-ring node and the type of the adjacent node of the node in the direction of the protection channel is not the off-ring node, remove the protection channel label in the received data stream, and perform the operation of leaving the ring.

* * * * *